United States Patent
Basu et al.

(10) Patent No.: US 10,946,368 B2
(45) Date of Patent: Mar. 16, 2021

(54) CATALYST AND RELATED METHODS INVOLVING HYDROSILYLATION AND DEHYDROGENATIVE SILYLATION

(71) Applicants: DOW SILICONES CORPORATION, Midland, MI (US); BOARD OF TRUSTEES OF THE UNIVERSITY OF ILLINOIS, Urbana, IL (US)

(72) Inventors: Debashis Basu, Urbana, IL (US); Aswini K. Dash, Midland, MI (US); Thomas B. Rauchfuss, Urbana, IL (US); Ryan Gilbert Watson, Urbana, IL (US)

(73) Assignees: DOW SILICONES CORPORATION, Midland, MI (US); BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 16/632,150

(22) PCT Filed: Jul. 17, 2018

(86) PCT No.: PCT/US2018/042421
§ 371 (c)(1),
(2) Date: Jan. 17, 2020

(87) PCT Pub. No.: WO2019/018357
PCT Pub. Date: Jan. 24, 2019

(65) Prior Publication Data
US 2020/0230585 A1   Jul. 23, 2020

Related U.S. Application Data

(60) Provisional application No. 62/533,217, filed on Jul. 17, 2017.

(51) Int. Cl.
*B01J 31/18* (2006.01)
*B01J 37/16* (2006.01)
*C07F 15/02* (2006.01)
*C07F 15/06* (2006.01)
*C07F 7/08* (2006.01)

(52) U.S. Cl.
CPC ........... *B01J 31/189* (2013.01); *B01J 37/16* (2013.01); *C07F 7/0879* (2013.01); *C07F 7/0896* (2013.01); *C07F 15/025* (2013.01); *C07F 15/065* (2013.01); *B01J 2231/323* (2013.01); *B01J 2531/842* (2013.01); *B01J 2531/845* (2013.01)

(58) Field of Classification Search
CPC ................ B01J 31/189; B01J 37/16
See application file for complete search history.

(56) References Cited

U.S. PATENT DOCUMENTS

2015/0080536 A1* 3/2015 Diao ................ C08L 83/04
525/479

FOREIGN PATENT DOCUMENTS

| WO | 2014117752 A1 | 8/2014 | |
| WO | WO-2014117752 A1 * | 8/2014 | ............ C07F 15/065 |
| WO | 2015077298 A1 | 5/2015 | |
| WO | 2016099727 A2 | 6/2016 | |

OTHER PUBLICATIONS

Ryan Gilbert-Wilson et al., Inorganic Chemistry, (2015), 54(11), p. 5596-5603.*
International Search Report for PCT/US2018/042421 dated Oct. 2, 2018, 5 pages.
Brian A. Schaefer et al., "Evaluation of Cobalt Complexes Bearing Tridentate Pincer Ligands for Catalytic C—H Borylation", Organometallics, vol. 34, No. 7, Apr. 13, 2015, pp. 1307-1320.
Ryan Gilbert-Wilson et al., "Phosphine-Iminopyridines as Platforms for Catalytic Hydrofunctionalization of Alkenes", Inorganic Chemistry, vol. 54, No. 11, May 15, 2015, pp. 5596-5603.
LaPointe, Anne M., Francis C. Rix, and Maurice Brookhart. "Mechanistic studies of palladium (II)-catalyzed hydrosilation and dehydrogenative silation reactions." Journal of the American Chemical Society 119.5 (1997): 906-917.
Atienza, Crisita Carmen Hojilla, et al. "Bis (imino) pyridine cobalt-catalyzed dehydrogenative silylation of alkenes: scope, mechanism, and origins of selective allylsilane formation." Journal of the American Chemical Society 136.34 (2014): 12108-12118.
Chu, Wan-Yi, et al. "Cobalt Phosphino-α-Iminopyridine-Catalyzed Hydrofunctionalization of Alkenes: Catalyst Development and Mechanistic Analysis." Organometallics 35.17 (2016): 2900-2914.
Liu, Ling, et al. "Hydrosilylation reaction of ethylene with triethoxysilane catalyzed by ruthenium halides and promoted by cuprous halides." Journal of Organometallic Chemistry 745 (2013): 454-459.
Machine assisted English translation of WO2014117752A1 obtained from https://patents.google.com on Jan. 15, 2020, 28 pages.

* cited by examiner

*Primary Examiner* — Yong L Chu
(74) *Attorney, Agent, or Firm* — Warner Norcross + Judd LLP

(57) ABSTRACT

A catalyst having a specific structure and a method of preparing the catalyst is disclosed. A composition is also disclosed, which comprises: (A) an unsaturated compound including at least one aliphatically unsaturated group per molecule, subject to at least one of the following two provisos: (1) the (A) unsaturated compound also includes at least one silicon-bonded hydrogen atom per molecule; and/or (2) the composition further comprises (B) a silicon hydride compound including at least one silicon-bonded hydrogen atom per molecule. The composition further comprises (C) the catalyst. A method of preparing a hydrosilylation reaction product and a dehydrogenative silylation reaction product are also disclosed.

13 Claims, No Drawings

CATALYST AND RELATED METHODS INVOLVING HYDROSILYLATION AND DEHYDROGENATIVE SILYLATION

CROSS-REFERENCE TO RELATED APPLICATIONS

This application is the National Stage of International Application No. PCT/US2018/042421 filed on 17 Jul. 2018, which claims priority to and all advantages of U.S. Provisional Application No. 62/533,217, filed on 17 Jul. 2017, the contents of which are incorporated herein by reference.

FIELD OF THE INVENTION

The present invention generally relates to a catalyst and, more specifically, to a catalyst for hydrosilylation and/or dehydrogenative silylation and related methods, as well as to a method of preparing the catalyst and a composition including the same.

DESCRIPTION OF THE RELATED ART

Hydrosilylation reactions are generally known in the art and involve an addition reaction between silicon-bonded hydrogen and aliphatic unsaturation. Hydrosilylation reactions are utilized in various applications. For example, curable compositions may rely on hydrosilylation reactions for purposes of curing or crosslinking components of the curable compositions. Hydrosilylation reactions may also be utilized to prepare individual components or compounds, e.g. components for inclusion in curable compositions.

Hydrosilylation reactions are carried out in the presence of a catalyst, which is typically a platinum metal due to its excellent catalytic activity. Platinum metal is generally much more expensive than other metals with lesser catalytic activities. Generally, non-platinum catalysts suffer from instability when exposed to ambient conditions, e.g. non-platinum catalysts can be prone to undesirable side reactions with ambient oxygen and water, thereby limiting use and potential end applications thereof.

Dehydrogenative silylation reactions are also known in the art and similarly involve a reaction between silicon-bonded hydrogen and aliphatic unsaturation. However, in dehydrogenative silylation, there is no addition reaction, and instead the aliphatic unsaturation bonds to silicon. Dehydrogenative silyation reactions may be utilized to prepare unsaturated compounds (e.g. olefin functional compounds) which may further undergo a hydrosilylation reaction.

SUMMARY OF THE INVENTION

The present invention provides a catalyst having the following structure:

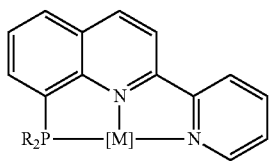

wherein each R is an independently selected substituted or unsubstituted hydrocarbyl group; [M] has formula $M'X_nL_m$, where M' is a metal selected from Fe, Co, and Ni; each X is independently a halogen atom, an alkoxy group, an amide group, an alkyl group, a silyl group, or H; each L is independently an olefin, an agostic C—H, an agostic Si—H, an ether, a nitrile, or $N_2$; n is 0, 1, or 2, and m is 0, 1, or 2.

The present invention also provides a method of preparing the catalyst. The method comprises complexing a metal compound with a ligand to give the catalyst. The metal compound has the formula $M'X_2$, wherein M' is a metal selected from Fe, Co, and Ni and each X is independently a halogen atom. The ligand has the following structure:

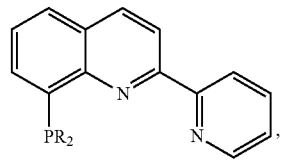

wherein each R is an independently selected substituted or unsubstituted hydrocarbyl group.

A method of preparing a catalytic reaction product is also provided. The method of preparing the catalytic reaction product comprises reductively activating the catalyst with an activating compound to prepare the catalytic reaction product. The catalytic reaction product, and a catalyst mixture of the catalyst and the activating compound are also provided.

The present invention further provides a composition. The composition comprises (A) an unsaturated compound including at least one aliphatically unsaturated group per molecule, subject to at least one of the following two provisos: (1) the (A) unsaturated compound also includes at least one silicon-bonded hydrogen atom per molecule; and/or (2) the composition further comprises (B) a silicon hydride compound including at least one silicon-bonded hydrogen atom per molecule. The composition further comprises (C) the catalyst.

In addition, a method of preparing a hydrosilylation reaction product is provided, along with the hydrosilylation reaction product formed in accordance with the method. The method comprises reacting an aliphatically unsaturated group and a silicon-bonded hydrogen atom in the presence of (C') a hydrosilylation catalyst to give the hydrosilylation reaction product. The aliphatically unsaturated group is present in (A) an unsaturated compound; wherein at least one of the following two provisos applies: (1) the (A) unsaturated compound also includes at least one silicon-bonded hydrogen atom per molecule; and/or (2) the silicon-bonded hydrogen atom is present in (B) a silicon hydride compound separate from the (A) unsaturated compound. The (C') hydrosilylation catalyst comprises the catalyst set forth above.

Further still, a method of preparing a dehydrogenative silylation reaction product is provided, along with the dehydrogenative silylation reaction product formed in accordance with the method. The method comprises reacting an aliphatically unsaturated group and a silicon-bonded hydrogen atom in the presence of (C'') a silylation catalyst to prepare the dehydrogenative silylation reaction product. The aliphatically unsaturated group is present in (A) an unsaturated compound; wherein at least one of the following two provisos applies: (1) the (A) unsaturated compound also includes at least one silicon-bonded hydrogen atom per molecule; and/or (2) the silicon-bonded hydrogen atom is present in (B) a silicon hydride compound separate from the (A) unsaturated compound. The (C″) silylation catalyst comprises the catalyst set forth above.

DETAILED DESCRIPTION OF THE INVENTION

The present invention provides a catalyst. The catalyst has excellent physical properties and may be utilized at least in hydrosilylation reactions and/or dehydrogenative silylation reactions. A method of preparing the catalyst is also disclosed, along with a composition comprising the catalyst. Given the diverse end use applications of the catalyst and its catalytic activity, a method of preparing a hydrosilylation reaction product and a method of preparing a dehydrogenative silylation reaction product with the catalyst are also disclosed. The hydrosilylation react product and the dehydrogenative silylation reaction product may be utilized in diverse end use applications, as described in greater detail below.

The catalyst has the following structure:

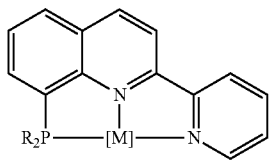

wherein each R is an independently selected substituted or unsubstituted hydrocarbyl group; [M] has formula $M'X_nL_m$, where M' is a metal selected from Fe, Co, and Ni; each X is independently a halogen atom, an alkoxy group, an amide group, an alkyl group, a silyl group, or H; each L is independently an olefin, an agostic C—H, an agostic Si—H, an ether, a nitrile, or $N_2$; n is 0, 1, or 2, and m is 0, 1, or 2. Subscripts n and m generally correspond to an oxidation state of the M' metal and the particular ligands represented by X and L. X and L may bond or complex to one another.

The halogen atoms optionally represented by X and L are not limited and are independently selected. In certain embodiments, the halogen atoms are selected from Cl and Br.

In certain embodiments, depending on an oxidation state of M', n is 2 and m is 0 such that [M] has formula $M'X_2$. Upon initial preparation of the catalyst, as described below, each X is typically a halogen atom. For example, [M] may be $FeCl_2$, $FeBr_2$, FeBrCl, $CoCl_2$, $CoBr_2$, CoBrCl, $NiCl_2$, $FeBr_2$, FeBrCl, etc. Typically, each halogen atom is the same in [M]. In embodiments when [M] has formula $M'X_2$, the catalyst has the following structure:

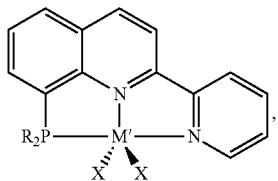

where M', R, and X are defined above.

Each R, which is independently selected, may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group.

Substituted hydrocarbyl groups are hydrocarbyl groups having one or more atoms (e.g. C and/or H) replaced (i.e., substituted) with another atom or substituent (i.e., group), for example, a halogen atom such as chlorine, fluorine, bromine or iodine, an oxygen atom, an oxygen atom containing group such as an acrylic, methacrylic, alkoxy, or carboxyl group, a nitrogen atom, a nitrogen atom containing group such as an amino, amido, or cyano group, a sulphur atom, or a sulphur atom containing group such as a mercapto group. Examples of substituted hydrocarbyl groups include propyl groups substituted with chlorine or fluorine, such as 3,3,3-trifluoropropyl groups, chloro- and alkoxy-phenyl groups, beta-(perfluorobutyl)ethyl groups, chlorocyclohexyl groups, and heteroaryls such as pyridinyl groups.

Hydrocarbyl groups may be exemplified by methyl, ethyl, propyl, isopropyl, butyl, isobutyl, t-butyl, pentyl, hexyl, cyclohexyl, heptyl, octyl, nonyl, decyl, or similar alkyl groups; vinyl, allyl, propenyl, isopropenyl, butenyl, isobutenyl, pentenyl, heptenyl, hexenyl, cyclohexenyl, or similar alkenyl groups; phenyl, tolyl, xylyl, naphthyl, or similar aryl groups; benzyl, phenethyl, or similar aralkyl groups; and 3-chloropropyl, 2-bromoethyl, 3,3,3-trifluoropropyl, or similarly substituted (e.g. halogenated) alkyl groups.

In certain embodiments, each R is independently selected based on a factor such as steric hindrance, electronics (e.g. electron donative, inductive, or withdrawing effects), and the like, or combinations thereof. R may be selected to impart chirality or to impart symmetry to the catalyst. In these or other embodiments, R may be independently selected to enforce reactive regioselectivity, such as anti-Markovnikov selectivity.

In certain embodiments, each R is independently non-linear, e.g. branched or cyclic (e.g. aryl). For example, R may be isopropyl, isobutyl, t-butyl, other branched alkyl. Alternatively, R may be substituted aryl, e.g. pentafluorophenyl. In specific embodiments, each R in the catalyst is the same. As but two specific examples, each R is isopropyl, or each R is pentafluorophenyl.

When n is 2 and m is 0 such that [M] has formula $M'X_2$, and when each R is the same, specific examples of the catalyst are set forth below:

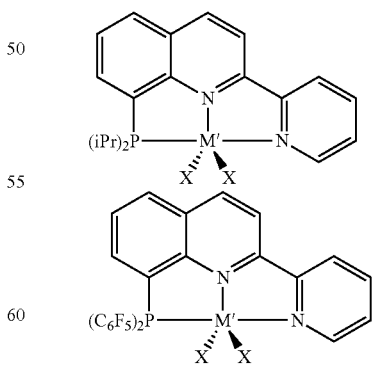

where iPr means isopropyl and M' and X are defined above. Depending on an oxidation state of M', additional ligands represented by X or L may be present in the catalyst, and the examples above are merely exemplary examples.

Further still, when n is 2 and m is 0 such that [M] has formula M'X$_2$, when each R is the same, and when each X is the same in each molecule, specific examples of the catalyst are set forth below:

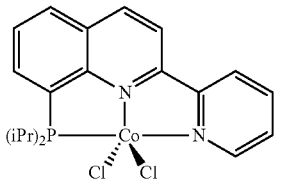

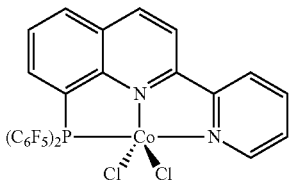

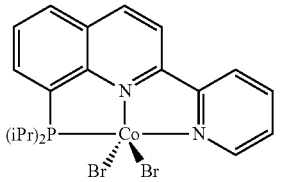

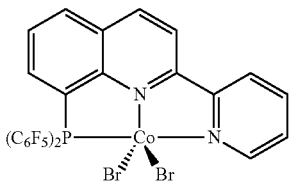

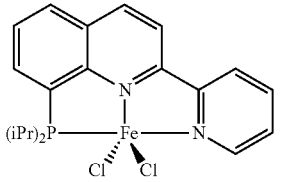

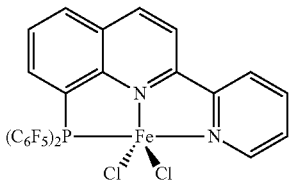

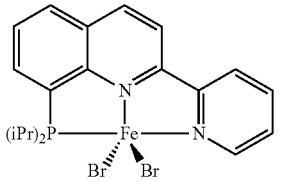

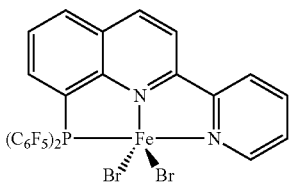

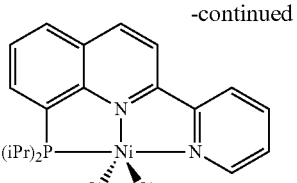

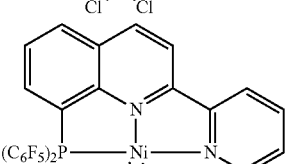

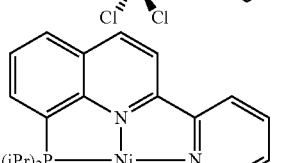

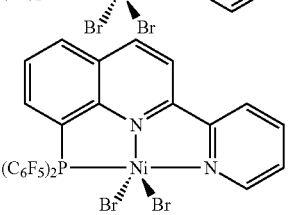

The catalyst may be in or on a solid carrier. Examples of carriers include activated carbons, silicas, silica aluminas, aluminas, zeolites and other inorganic powders/particles (e.g. sodium sulphate), and the like. The catalyst may also be disposed in a vehicle, e.g. a solvent which solubilizes the catalyst, alternatively a vehicle which merely carries or disperses, but does not solubilize, the catalyst. Such vehicles are known in the art. Depending on various selections, when the catalyst is disposed in the vehicle or solvent, the vehicle or solvent, or a moiety thereof, may complex with the M' metal and become a ligand represented by X or L.

Suitable vehicles include polyorganosiloxanes, such as hexamethyldisiloxane, octamethyltrisiloxane, hexamethylcyclotrisiloxane and other polyorganosiloxanes.

Alternatively, the vehicle may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

Typically, [M] of the catalyst upon its formation is of formula M'X$_2$, where each X is typically a halogen atom. However, the M' metal may complex with the vehicle or solvent, or a moiety thereof, if present along with the catalyst. Further, when catalyzing a reaction, as described below, X and/or L may be something other than a halogen atom. Moreover, as described below, the catalyst may be activated prior to and/or during any reaction catalyzed therewith.

A catalyst mixture is also provided. The catalyst mixture comprises the catalyst and an activating compound. In certain embodiments, the activating compound influences or modifies the catalytic activity of the catalyst. Specifically, the activating agent may influence the complex of the M' metal and ligands X and L (e.g. may decomplex ligands X and/or L, if present in the catalyst and complexed to the M' metal). This generally increases catalytic activity of the catalyst by allowing the M' metal to complex with other ligands while catalyzing a reaction. The activating compound typically reductively activates the catalyst. Reductively activating the catalyst generally comprises reducing the formal oxidation state of the M' metal.

In certain embodiments, the activating compound is i) a borohydride compound; (ii) an aluminum hydride compound; (iii) an organolithium compound; (iv) an organomagnesium compound; or (v) any combination of (i) to (iv). The borohydride compound may be, for example, a metal borohydride such as sodium triethylborohydride (NaEt$_3$BH), lithium triethylborohydride (LiEt$_3$BH), or sodium borohydride. Additional examples of suitable activating compounds include an alkalimetal amalgam; hydrogen; a metal hydride such as sodium naphthalenide; a silyl hydride; etc. Suitable reducing agents include those described in Chem. Rev. 1996, 96, 877-910.

The relative amounts of the catalyst and the activating compound may vary depending, for example, on the selection of the catalyst, including the M' metal and its oxidation state, the ligands represented by X and/or L, the number of hydrogen atoms present within the activating compound, etc. One of skill in the art readily understands how to determine proper molar ratios in view of these selections.

The catalyst mixture typically forms a reaction product upon the activating compound reductively activating the catalyst. A catalytic reaction product formed from the catalyst mixture is also provided. The catalytic mixture and/or the catalytic reaction product is typically utilized when catalyzing the reaction, which may be formed prior to or contemporaneous with catalyzing the reaction (e.g. formed in situ). The catalyst mixture and/or the catalytic reaction product may be formed in situ in the presence of the components catalyzed by the catalyst mixture and/or the catalytic reaction product.

A method of preparing the catalytic reaction product is also provided. The method comprises reductively activating the catalyst with the activating compound to prepare the catalytic reaction product. Typically, the method comprises combining the catalyst and the activating compound, which then react via the activating compound reductively activating the catalyst. Thus, reductively activating the catalyst typically occurs when the catalyst is in the presence of the activating compound without further steps of initiating. The catalyst and the activating compound may be combined in any manner, with any equipment, optionally while disposed in a vehicle or with other components, and optionally under shear or mixing.

A method of preparing the catalyst is also provided. The method comprises complexing a metal compound with a ligand to give the catalyst.

The metal compound has the formula M'X$_2$, wherein M' and X are defined above.

The ligand has the following structure:

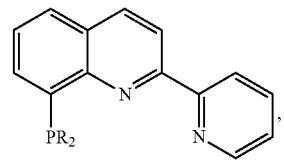

wherein each R is an independently selected substituted or unsubstituted hydrocarbyl group.

The catalyst may be prepared in a vehicle, such as any of the vehicles described above. For example, the catalyst may be prepared in the vehicle in which the catalyst is disposed during use thereof. In certain embodiments, the catalyst is prepared in the presence of tetrahydrofuran.

The ligand may be provided, obtained, or prepared. In certain embodiments, the method of preparing the catalyst further comprises preparing the ligand prior to and/or in conjunction with complexing the metal compound with the ligand. As understood in the art, the ligand can be prepared or synthesized via numerous paths or techniques.

In specific embodiments, the ligand can be prepared according to the reaction scheme set forth below:

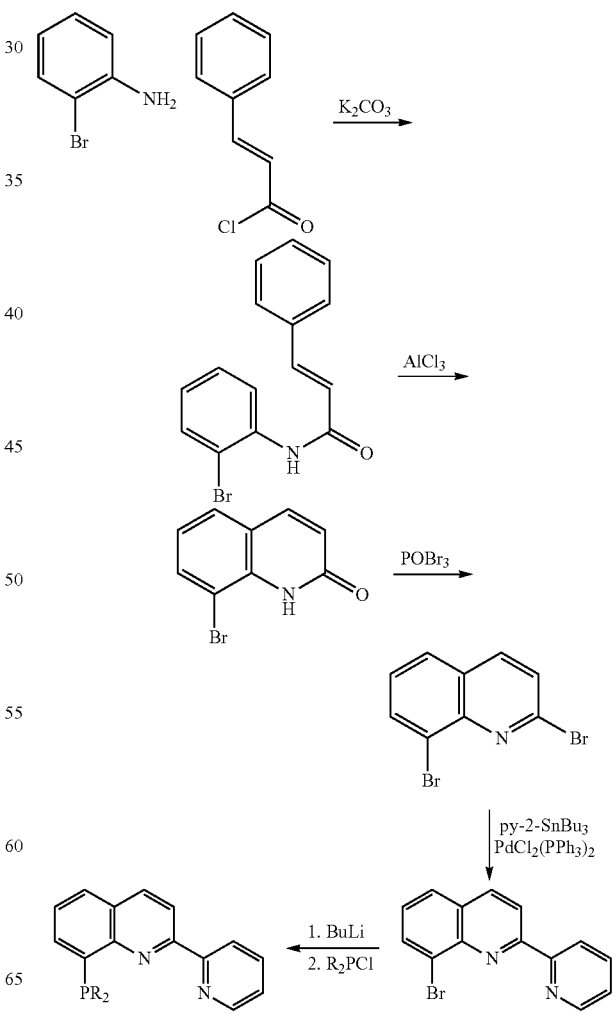

where R is defined above, py-2-SnBu3 is 2-(tributylstannyl) pyridine, and R is defined above. Some of the initial steps associated with this reaction scheme are known by those of skill in the art, for example as disclosed in "Visible Light-driven Hydrogen Evolution from Water Catalyzed by A Molecular Cobalt Complex," Tong, L.; Zong, R.; Thummel, R. P. J. Am. Chem. Soc. 2014, 136, 4881-4884; and/or in "Iron Complexes of Square Planar Tetradentate Polypyridyl-type Ligands as Catalysts for Water Oxidation," Wickramasinghe, L. D.; Zhou, R.; Zong, R.; Vo, P.; Gagnon, K.; Thummel, R. P. J. Am. Chem. Soc. 2015, 137, 13260-13263.

As introduced above, the present invention also provides a composition. The composition comprises (A) an unsaturated compound. The (A) unsaturated compound includes at least one aliphatically unsaturated group per molecule, which may alternatively be referred to as ethylenic unsaturation. The (A) unsaturated compound is not limited and may be any unsaturated compound having at least one aliphatically unsaturated group. In certain embodiments, the (A) unsaturated compound comprises an organic compound. In other embodiments, the (A) unsaturated compound comprises a siloxane. In yet other embodiments, the (A) unsaturated compound comprises a silicone-organic hybrid, or an organosilicon compound. Various embodiments and examples of the (A) unsaturated compound are disclosed below.

In certain embodiments, the (A) unsaturated compound includes an average of at least two aliphatically unsaturated groups per molecule. In such embodiments, the (A) unsaturated compound is capable of polymerization. The aliphatically unsaturated groups of the (A) unsaturated compound may be terminal, pendent, or in both locations in the (A) unsaturated compound.

For example, the aliphatically unsaturated group may be an alkenyl group and/or an alkynyl group. "Alkenyl group" means an acyclic, branched or unbranched, monovalent hydrocarbon group having one or more carbon-carbon double bonds. The alkenyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkenyl groups are exemplified by, but not limited to, vinyl, allyl, propenyl, and hexenyl. "Alkynyl group" means an acyclic, branched or unbranched, monovalent hydrocarbon group having one or more carbon-carbon triple bonds. The alkynyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Alkynyl is exemplified by, but not limited to, ethynyl, propynyl, and butynyl.

In specific embodiments, the (A) unsaturated compound has the formula $R^1$—$Z'$—$R^1$, where $Z'$ is a divalent linking group, which may be a divalent hydrocarbon, a polyoxyalkylene, a polyalkylene, a polyisoalkylene, a hydrocarbon-silicone copolymer, a siloxane, or mixtures thereof. $Z'$ may be linear or branched. In these specific embodiments, $R^1$ is independently selected and includes aliphatic unsaturation, i.e., $R^1$ is independently selected from alkenyl groups and alkynyl groups.

In these specific embodiments, the (A) unsaturated compound includes two aliphatically unsaturated groups represented by $R^1$.

In one embodiment of the (A) unsaturated compound, $Z'$ is a divalent hydrocarbon. The divalent hydrocarbon $Z'$ may contain 1 to 30 carbons, either as aliphatic or aromatic structures, and may be branched or unbranched. Alternatively, the linking group $Z'$ may be an alkylene group containing 1 to 12 carbons. In these embodiments, the (A) unsaturated compound may be selected from α, ω-unsaturated hydrocarbons. The α, ω-unsaturated hydrocarbons may alternatively be referred to as olefins.

For example, the (A) unsaturated compound may be any diene, diyne or ene-yne compound. With reference to the formula above, in these embodiments, $R^1$ may be, for example, independently selected from $CH_2$=CH—, $CH_2$=CHCH_2—, $CH_2$=CH(CH_2)_4—, $CH_2$=C(CH_3)CH_2$— or and similar substituted unsaturated groups such as $H_2C$=C(CH_3)—, and HC=C(CH_3)—. In such embodiments, the (A) unsaturated compound may be referred to as an α,ω-unsaturated hydrocarbon. The α,ω-unsaturated hydrocarbon may be, for example, an α,ω-diene of the formula $CH_2$=CH(CH_2)_bCH=CH_2$, an α,ω-diyne of the formula CH≡C(CH_2)_bC≡CH, an α,ω-ene-yne of the formula $CH_2$=CH(CH_2)_bC≡CH, or mixtures thereof, where b is independently from 0 to 20.

Specific examples of suitable diene, diyne or ene-yne compounds include 1,4-pentadiene, 1,5-hexadiene; 1,6-heptadiene; 1,7-octadiene, 1,8-nonadiene, 1,9-decadiene, 1,11-dodecadiene, 1,13-tetradecadiene, and 1,19-eicosadiene, 1,3-butadiyne, 1,5-hexadiyne (dipropargyl), and 1-hexene-5-yne.

However, the (A) unsaturated compound may alternatively have the formula R-Z", where $R^1$ is defined above and Z" is a monovalent hydrocarbon group. In these specific embodiments, the (A) unsaturated compound includes one aliphatically unsaturated group represented by $R^1$.

In specific embodiments, the (A) unsaturated compound comprises ethylene, or $CH_2$=$CH_2$. Ethylene includes only one aliphatically unsaturated group, and does not include any divalent or monovalent linking group. Ethylene may be utilized in gaseous form as the (A) unsaturated compound. In these embodiments, the composition is typically formed in a vessel, which may optionally be pressured, with ethylene. For example, the vessel may be pressured with ethylene at a pressure that is greater than atmospheric pressure, which can further drive the reaction. Temperatures may be elevated in the vessel as well.

When the (A) unsaturated compound includes only one aliphatically unsaturated group, the (A) unsaturated compound may be referred to as an unsaturated hydrocarbon, and may be any -ene or -yne compound. In such embodiments, the (A) unsaturated compound may be an acyclic alkene and/or an acyclic alkyne. However, the (A) unsaturated compound may include aryl groups so long as the (A) unsaturated compound also includes the at least one aliphatically unsaturated group independent from any aryl groups.

In another embodiment, the (A) unsaturated compound comprises, alternatively is, a polyether. In these embodiments, the (A) unsaturated compound comprises a polyoxyalkylene group having the formula $(C_aH_{2a}O)$, wherein a is from 2 to 4 inclusive. With reference to the general formula above, $Z'$ is the polyoxyalkylene group. In these embodiments, the (A) unsaturated compound may be referred to as the polyoxyalkylene.

The polyoxyalkylene may comprise oxyethylene units $(C_2H_4O)$, oxypropylene units $(C_3H_6O)$, oxybutylene or oxytetramethylene units $(C_4H_8O)$, or mixtures thereof, which may be in block form or randomized in the (A) unsaturated compound.

For example, the (A) unsaturated compound as the polyoxyalkylene may have the following general formula:

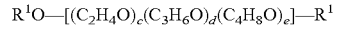

wherein each $R^1$ is independently selected and defined above, c is from 0 to 200, d is from 0 to 200, and e is from 0 to 200, with the proviso that c, d and e are not simultaneously 0. In specific embodiments, c is from 0 to 50, alternatively from 0 to 10, alternatively from 0 to 2. In these or other embodiments, d is from 0 to 100, alternatively 1 to 100, alternatively 5 to 50. In these or other embodiments, e is from 0 to 100, alternatively 0 to 50, alternatively 0 to 30. In various embodiments, the ratio of (d+e)/(c+d+e) is greater than 0.5, alternatively greater than 0.8, or alternatively greater than 0.95.

This polyoxyalkylene is terminated at each molecular chain end (i.e. alpha and omega positions) with $R^1$, which is independently selected and described above. Additional examples of $R^1$ include $H_2C=C(CH_3)CH_2-$, $H_2C=CHCH_2CH_2-$, $H_2C=CHCH_2CH_2CH_2-$, and $H_2C=CHCH_2CH_2CH_2CH_2-$, $HC\equiv C-$, $HC\equiv CCH_2-$, $HC\equiv CCH(CH_3)-$, $HC\equiv CC(CH_3)_2-$, $HC\equiv CC(CH_3)_2CH_2-$. However, the polyoxyalkylene set forth above is merely one exemplary example of a suitable polyoxyalkylene.

In specific embodiments, the polyoxyalkylene group comprises only oxypropylene units $(C_3H_6O)$. Representative, non-limiting examples of polyoxypropylene-containing polyoxyalkylenes include: $H_2C=CHCH_2[C_3H_6O]_d$ $CH_2CH=CH_2$, $H_2C=CH[C_3H_6O]_dCH=CH_2$, $H_2C=C(CH_3)CH_2[C_3H_6O]_dCH_2C(CH_3)=CH_2$, $HC\equiv CCH_2$ $[C_3H_6O]_dCH_2C\equiv CH$, and $HC\equiv CC(CH_3)_2[C_3H_6O]_dC(CH_3)_2C\equiv CH$, where d is as defined above.

Representative, non-limiting examples of polyoxybutylene or poly(oxytetramethylene) containing polyoxyalkylenes include: $H_2C=CHCH_2[C_4H_8O]_eCH_2CH=CH_2$, $H_2C=CH[C_4H_8O]_eCH=CH_2$, $H_2C=C(CH_3)CH_2[C_4H_8O]_eCH_2C(CH_3)=CH_2$, $HC\equiv CCH_2[C_4H_8O]_eCH2C\equiv CH$, and $HC\equiv CC(CH_3)_2[C_4H_8O]_eC(CH_3)_2C\equiv CH$, where e is as defined above.

The examples of polyoxyalkylenes suitable for (A) the unsaturated compound include two aliphatically unsaturated groups. However, the polyoxyalkylene suitable for (A) the unsaturated compound may include only one aliphatically unsaturated group. For example, the polyoxyalkylene suitable for (A) the unsaturated compound may alternatively have the following general formula:

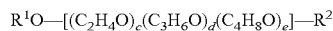

where $R^1$, c, d, and e are defined above, and $R^2$ is H or an alkyl group, such as $CH_3$. Any description or examples above also apply to this embodiment as well. One of skill in the art readily understands how the examples of polyoxyalkylenes above with two aliphatically unsaturated groups may alternatively include but one aliphatically unsaturated group.

The polyoxyalkylene may be prepared by, for example, the polymerization of ethylene oxide, propylene oxide, butylene oxide, 1,2-epoxyhexane, 1,2-epoxyoctance, and/or cyclic epoxides, such as cyclohexene oxide or exo-2,3-epoxynorborane. The polyoxyalkylene moiety of the polyoxyalkylene may comprise oxyethylene units $(C_2H_4O)$, oxypropylene units $(C_3H_6O)$, oxybutylene units $(C_4H_8O)$, or mixtures thereof. Typically, the polyoxyalkylene group comprises a majority of oxypropylene or oxybutylene units, as defined on a molar basis and indicated in the above formula by the c, d, and e subscripts.

In another embodiment, Z' of the general formula $R^1-Z'-R^1$ or Z" of the formula $R^1-Z"$ of the (A) unsaturated compound comprises a polyalkylene group. The polyalkylene group may comprise from $C_2$ to $C_6$ alkylene units or their isomers. One specific example is polyisobutylene group, which is a polymer including isobutylene units. For example, the (A) unsaturated compound may be a di-allyl terminated polyisobutylene or an allyl-terminated polyisobutylene. The molecular weight of the polyisobutylene group may vary, but typically ranges from 100 to 10,000 g/mole.

In certain embodiments, the (A) unsaturated compound comprises an organopolysiloxane. The organopolysiloxane is not limited and may be any organopolysiloxane including at least one silicon-bonded aliphatically unsaturated group per molecule. For example, the organopolysiloxane may be linear, branched, partly branched, cyclic, resinous (i.e., have a three-dimensional network), or may comprise a combination of different structures. When the (A) unsaturated compound comprises the organopolysiloxane, the aliphatically unsaturated group is silicon-bonded (e.g. as silicon-bonded alkenyl and/or silicon-bonded alkynyl).

In certain embodiments when the (A) unsaturated compound comprises an organopolysiloxane, the organopolysiloxane has the following average formula:

wherein each $R^5$ is an independently selected substituted or unsubstituted hydrocarbyl group with the proviso that in each molecule, at least one, alternatively at least two, $R^5$ groups is an aliphatically unsaturated group, and wherein f is selected such that $0<f\leq3.2$.

The average formula above for the organopolysiloxane may be alternatively written as $(R^5_3SiO_{1/2})_w(R^5_2SiO_{2/2})_x$ $(R^5SiO_{3/2})_y(SiO_{4/2})_z$, where $R^5$ and its proviso is defined above, and w, x, y, and z are independently from ≤0 to ≥1, with the proviso that w+x+y+z=1. One of skill in the art understands how such M, D, T, and Q units and their molar fractions influence subscript f in the average formula above. T and Q units, indicated by subscripts y and z, are typically present in silicone resins, whereas D units, indicated by subscript x, are typically present in silicone polymers (and may also be present in silicone resins).

Each $R^5$ is independently selected, as introduced above, and may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group. Examples of substituted and unsubstituted hydrocarbyl groups are introduced above relative to R. Examples of aliphatically unsaturated group(s) are also introduced above.

In certain embodiments, the organopolysiloxane is substantially linear, alternatively is linear. In these embodiments, the substantially linear organopolysiloxane may have the average formula:

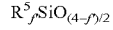

wherein each $R^5$ and its proviso are defined above, and wherein f' is selected such that $1.9\leq f'\leq2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000 mPa·s, alternatively from 100 to 1,000,000 mPa·s, alternatively from 100 to 100,000 mPa·s, at 25° C. Viscosity may be measured at 25° C. via a Brookfield LV DV-E viscometer, as understood in the art.

In specific embodiments in which the organopolysiloxane is substantially linear or linear, the organopolysiloxane may have the average formula:

$(R^5_3SiO_{1/2})_{m'}(R^5_2SiO_{2/2})_{n'}(R^5SiO_{3/2})_{o'}$ wherein each $R^5$ is independently selected and defined above (including the proviso that in each molecule, at least one $R^5$ is an aliphatically unsaturated group), and m'≥2, n'≥0, and o≥2. In specific embodiments, m' is from 2 to 10, alternatively from 2 to 8, alternatively from 2 to 6. In these or other embodiments, n' is from 0 to 1,000, alternatively from 1 to 500, alternatively from 1 to 200. In these or other embodiments, o is from 2 to 500, alternatively from 2 to 200, alternatively from 2 to 100.

When the organopolysiloxane is substantially linear, alternatively is linear, the silicon-bonded aliphatically unsaturated group(s) may be pendent, terminal or in both pendent and terminal locations. As a specific example of the organopolysiloxane having pendent silicon-bonded aliphatically unsaturated groups, the organopolysiloxane may have the average formula:

$(CH_3)_3SiO[(CH_3)_2SiO]_{n'}[(CH_3)ViSiO]_{m'}Si(CH_3)_3$ where n' and m' are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Alternatively, as a specific example of the organopolysiloxane having terminal silicon-bonded aliphatically unsaturated groups, the organopolysiloxane may have the average formula:

$Vi(CH_3)_2SiO[(CH_3)_2SiO]_{n'}Si(CH_3)_2Vi$ where n' and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, the (A) organopolysiloxane may have the average formula:

$Vi(CH_3)_2SiO[(CH_3)_2SiO]_{n'}[(CH_3)ViSiO]_{m'}SiVi(CH_3)_2$ where n', m' and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, the (A) organopolysiloxane may be a resinous organopolysiloxane. In these embodiments, the resinous organopolysiloxane may have the average formula:

$R^5_{f''}SiO_{(4-f'')/2}$ wherein each $R^5$ and its provisos are defined above, and wherein f'' is selected such that 0.5≤f''≤1.7.

The resinous organopolysiloxane has a branched or a three dimensional network molecular structure. At 25° C., the resinous organopolysiloxane may be in a liquid or in a solid form, optionally dispersed in a carrier, which may solubilize and/or disperse the resinous organopolysiloxane therein.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). Typically, the resinous organopolysiloxane comprises T and/or Q units. A specific example of the resinous organopolysiloxane is a vinyl-terminated silsesquioxane.

The organopolysiloxane may comprise a combination or mixture of different organopolysiloxanes, including those of different structures.

Alternatively, the (A) unsaturated compound may be a silicone-organic hybrid. For example, the (A) unsaturated compound may comprise the hydrosilylation reaction product of organopolysiloxanes (or of one or more organopolysiloxanes with one or more organic compounds), in which case the backbone of the (A) unsaturated compound may include organic divalent linking groups. As another example, organohydrogensiloxanes may be reacted with other organopolysiloxanes, or with organic compounds, to give the (A) unsaturated compound.

For example, the (A) unsaturated compound may be the reaction product of (a1) at least one Si—H compound and (b1) at least one compound having ethylenic unsaturation. In these embodiments, a molar excess of ethylenic unsaturated groups of the (b1) compound are utilized as compared to Si—H groups of the (a1) Si—H compound such that the (A) unsaturated compound includes at least one, alternatively an average of at least two, silicon-bonded aliphatically unsaturated groups.

The reaction product of the (a1) Si—H compound and the (b1) compound having ethylenic unsaturation may be referred to as an (AB)n type copolymer, with the (a1) Si—H compound forming units A and the (b1) compound having ethylenic unsaturation forming units B. Combinations of different (a1) Si—H compounds may be utilized, and combinations of different (b1) compounds having ethylenic unsaturation may be utilized, such that the resulting (b) crosslinking agent comprises distinct units but may not be an (AB)n type copolymer. The distinct units may be randomized or in block form.

Alternatively still, the (A) unsaturated compound may comprise an organosilicon-compound, but not an organopolysiloxane. For example, the (A) unsaturated compound may comprise a silane, a disilane, or a siloxane (for example a disiloxane), while not constituting an organopolysiloxane.

One example of a suitable silane is that of formula $R^6{}_{z''}SiR^7{}_{4-z''}$, where each $R^6$ independently is an aliphatically unsaturated group, $R^7$ is independently a substituted or unsubstituted hydrocarbyl group, and $1 \leq z'' \leq 4$. One example of a siloxane is tetramethyldivinyldisiloxane. One of skill in the art understands how to prepare or obtain such compounds for use as the (A) unsaturated compound.

The (A) unsaturated compound can be a single unsaturated compound or a combination comprising two or more different silicon hydride compounds.

The composition and (A) unsaturated compound are subject to at least one of the following two provisos: (1) the (A) unsaturated compound also includes at least one silicon-bonded hydrogen atom per molecule; and/or (2) the composition further comprises (B) a silicon hydride compound including at least one silicon-bonded hydrogen atom per molecule.

In a first embodiment, the proviso (1) is true such that the (A) unsaturated compound also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the (A) unsaturated compound also includes at least one silicon-bonded hydrogen atom per molecule, and that the composition further comprises (B) a silicon hydride compound including at least one silicon-bonded hydrogen atom per molecule.

In the first embodiment, the proviso (1) is true and the (A) unsaturated compound includes at least one silicon-bonded hydrogen atom per molecule in addition to the aliphatically unsaturated group. In these embodiments, the (A) unsaturated compound may be any compound including at least one silicon-bonded hydrogen atom and at least one aliphatically unsaturated group. In these embodiments, the (A) unsaturated compound is typically an organosilicon compound and/or an organopolysiloxane.

One of skill in the art readily understands how to prepare or obtain such unsaturated compounds. For example, organosilicon compounds including both aliphatic unsaturated and silicon-bonded hydrogen may be prepared from the unsaturated organic compounds disclosed above. As but one example, an α,ω-diene of the formula $CH_2=CH(CH_2)_b CH=CH_2$ may be reacted with a silane of formula $H_2Si(CH_3)_2$ in the presence of a hydrosilylation catalyst to give an unsaturated compound of formula $CH_2=CH(CH_2)_b CH_2CH_2Si(CH_3)_2H$, which includes one aliphatically unsaturated group and one silicon-bonded hydrogen atom. The organosilicon compound may also be a silane, disilane, siloxane, etc. For example, the organosilicon compound may be of formula $R^6{}_{b'}H_{c'}SiR^7{}_{4-b'-c'}$, where $R^6$ and $R^7$ are independently selected and defined above, b' is 1, 2, or 3, c' is 1, 2, or 3, with the proviso that $2 \leq (b'+c') \leq 4$.

When the (A) unsaturated compound comprises the organopolysiloxane having both aliphatic unsaturation and silicon-bonded hydrogen, the organopolysiloxane may have the formula $R^5{}_dH_eSiO_{(4-d'-e')/2}$, where $R^5$ is independently selected and defined above (still subject to the proviso that at least one $R^5$ is the aliphatically unsaturated group), and e' and f' are each greater than 0 such that $0<(d'+e') \leq 3.2$.

Alternatively, when the (A) unsaturated compound comprises the organopolysiloxane having both aliphatic unsaturation and silicon-bonded hydrogen, the silicon-bonded aliphatically unsaturated group(s) and the silicon-bonded hydrogen atom(s) may be present in any M, D, and/or T siloxy unit present in the organopolysiloxane, and may be bonded to the same silicon atom (in the case of M and/or D siloxy units). The organopolysiloxane may comprise, for example, as M siloxy units: $(R^5{}_3SiO_{1/2})$, $(R^5{}_2HSiO_{1/2})$, $(R^5H_2SiO_{1/2})$, and/or $(H_3SiO_{1/2})$. The organopolysiloxane may comprise, for example, as D siloxy units: $(R^5{}_2SiO_{2/2})$, $(R^5HSiO_{2/2})$, and/or $(H_2SiO_{2/2})$. The organopolysiloxane may comprise, for example, as T siloxy units: $(R^5SiO_{3/2})$ and/or $(HSiO_{3/2})$. Such siloxy units may be combined in any manner, optionally along with Q siloxy units, to give an organopolysiloxane having at least one silicon-bonded aliphatically unsaturated group designated by $R^5$ and at least one silicon-bonded hydrogen atom.

For example, the organopolysiloxane may have any one of the following formulas: $(R^5{}_2HSiO_{1/2})_{w'}(R^5{}_2SiO_{2/2})_{x'}(R^5SiO_{3/2})_{y'}(SiO_{4/2})_{z'}$, $(R^5H_2SiO_{1/2})_{w'}(R^5{}_2SiO_{2/2})_{x'}(R^5SiO_{3/2})_{y'}(SiO_{4/2})_{z'}$, $(R^5{}_3SiO_{1/2})_{w'}(R^5HSiO_{2/2})_{x'}(R^5SiO_{3/2})_{y'}(SiO_{4/2})_{z'}$, $(R^5H_2SiO_{1/2})_{w'}(R^5HSiO_{2/2})_{x'}(R^5SiO_{3/2})_{y'}(SiO_{4/2})_{z'}$, $(R^5{}_3SiO_{1/2})_{w'}(R^5{}_2SiO_{2/2})_{x'}(HSiO_{3/2})_{y'}(SiO_{4/2})_{z'}$, $(R^5{}_3SiO_{1/2})_{w'}(R^5HSiO_{2/2})_{x'}(R^5SiO_{3/2})_{y'}(SiO_{4/2})_{z'}$, and/or $(R^5H_2SiO_{1/2})_{w'}(R^5HSiO_{2/2})_{x'}(HSiO_{3/2})_{y'}(SiO_{4/2})_{z'}$, etc, where each $R^5$ is independently selected and defined above (with at least one $R^5$ being an aliphatically unsaturated group), and w', x', y', and z' are independently from $\geq 0$ to $\leq 1$, with the proviso that $w'+x'+y'+z''=1$.

In the second embodiment, the proviso (2) is true and the composition further comprises (B) a silicon hydride compound including at least one silicon-bonded hydrogen atom per molecule. In these embodiments, the (B) silicon hydride compound may be any compound including at least one silicon-bonded hydrogen atom. Depending on a structure of the (B) silicon hydride compound, the (B) silicon hydride compound may be a silane compound, an organosilicon compound, an organohydrogensilane, an organohydrogensiloxane, etc.

The (B) silicon hydride compound can be linear, branched, cyclic, resinous, or have a combination of such structures. In acyclic polysilanes and polysiloxanes, the silicon-bonded hydrogen atom(s) can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

In certain embodiments, the (B) silicon hydride compound is of formula $R^8{}_{4-s}SiH_s$, where $R^8$ is independently selected and may be any silicon-bonded group, and s is selected such that $1 \leq s \leq 4$. Typically, s is 1, 2, or 3, alternatively 1 or 2. Each $R^8$ is typically independently a substituted or unsubstituted hydrocarbyl group. However, $R^8$ can be any silicon-bonded group so long as the (B) silicon hydride is still capable of undergoing hydrosilylation via its silicon-bonded hydrogen atom. For example, $R^8$ can be a halogen. When the (B) silicon hydride is a silane compound, the (B) silicon hydride can be a monosilane, disilane, trisilane, or polysilane.

In these or other embodiments, the (B) silicon hydride compound may be an organosilicon compound of formula: $H_gR^9{}_{3-g}Si-R^{10}-SiR^9{}_2H$, wherein each $R^9$ is an independently selected substituted or unsubstituted hydrocarbyl group, g' is 0 or 1, and $R^{10}$ is a divalent linking group. $R^{10}$ may be a siloxane chain (including, for example, $-R^9{}_2SiO-$, $-R^9HSiO-$, and/or $-H_2SiO-$ D siloxy units) or may be a divalent hydrocarbon group. Typically, the divalent hydrocarbon group is free of aliphatic unsaturation. The divalent hydrocarbon group may be linear, cyclic, branched, aromatic, etc., or may have combinations of such structures.

When g' is 1, and when $R^{10}$ is a divalent hydrocarbon group, specific examples of the (B) silicon hydride compound include:

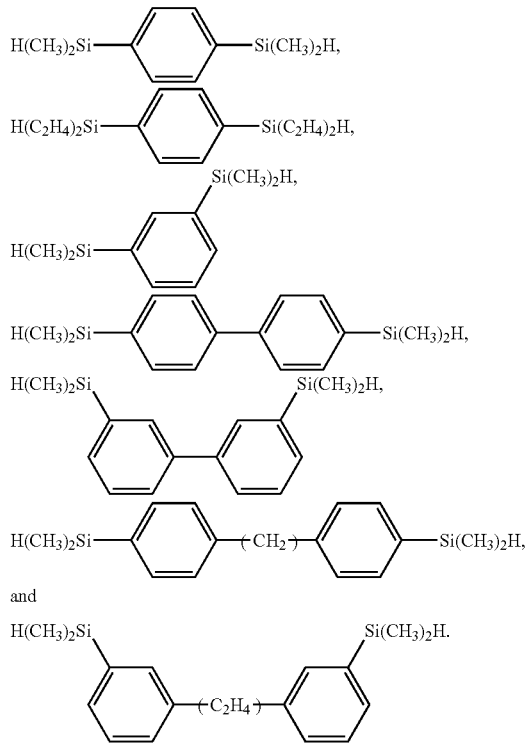

and

In these or other embodiments, the (B) silicon hydride compound comprises an organohydrogensiloxane, which can be a disiloxane, trisiloxane, or polysiloxane. Examples of organohydrogensiloxanes suitable for use as the (B) silicon hydride compound include, but are not limited to, siloxanes having the following formulae: $PhSi(OSiMe_2H)_3$, $Si(OSiMe_2H)_4$, $MeSi(OSiMe_2H)_3$, and $Ph_2Si(OSiMe_2H)_2$, wherein Me is methyl, and Ph is phenyl. Additional examples of organohydrogensiloxanes that are suitable for purposes of the (B) silicon hydride compound include 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), and a dimethylhydrogensiloxy-terminated poly(methylhydrogensiloxane).

When the (B) silicon hydride compound comprises an organohydrogensiloxane, the (B) silicon hydride compound may comprise any combination of M, D, T and/or Q siloxy units, so long as the (B) silicon hydride compound includes at least one silicon-bonded hydrogen atom. These siloxy units can be combined in various manners to form cyclic, linear, branched and/or resinous (three-dimensional networked) structures. The (B) silicon hydride compound may be monomeric, polymeric, oligomeric, linear, branched, cyclic, and/or resinous depending on the selection of M, D, T, and/or Q units.

Because the (B) silicon hydride compound includes at least one silicon-bonded hydrogen atom, with reference to the siloxy units set forth above, the (B) silicon hydride compound may comprise any of the following siloxy units including silicon-bonded hydrogen atoms, optionally in combination with siloxy units which do not include any silicon-bonded hydrogen atoms: $(R^9{}_2HSiO_{1/2})$, $(R^9H_2SiO_{1/2})$, $(H_3SiO_{1/2})$, $(R^9HSiO_{2/2})$, $(H_2SiO_{2/2})$, and/or $(HSiO_{3/2})$, where $R^9$ is independently selected and defined above.

In specific embodiments, for example when the (B) silicon hydride compound is linear, the (B) silicon hydride compound may have the average formula:

wherein each $R^{11}$ is independently hydrogen or $R^9$, each $R^9$ is independently selected and defined above, and e"≥2, f"'≥0, and g"≥2. In specific embodiments, e" is from 2 to 10, alternatively from 2 to 8, alternatively from 2 to 6. In these or other embodiments, f"' is from 0 to 1,000, alternatively from 1 to 500, alternatively from 1 to 200. In these or other embodiments, g" is from 2 to 500, alternatively from 2 to 200, alternatively from 2 to 100.

In one embodiment, the (B) silicon hydride compound is linear and includes one or more pendent silicon-bonded hydrogen atoms. In these embodiments, the (B) silicon hydride compound may be a dimethyl, methyl-hydrogen polysiloxane having the average formula;

$(CH_3)_3SiO[(CH_3)_2SiO]_{f'''}[(CH_3)HSiO]_{g''}Si(CH_3)_3$ where f'" and g" are defined above.

In these or other embodiments, the (B) silicon hydride compound is linear and includes terminal silicon-bonded hydrogen atoms. In these embodiments, the (B) silicon hydride compound may be an SiH terminal dimethyl polysiloxane having the average formula:

$H(CH_3)_2SiO[(CH_3)_2SiO]_{f'''}Si(CH_3)_2H$ where f"' is as defined above. The SiH terminal dimethyl polysiloxane may be utilized alone or in combination with the dimethyl, methyl-hydrogen polysiloxane disclosed immediately above. Further, the SiH terminal dimethyl polysiloxane may have one trimethylsiloxy terminal such that the SiH terminal dimethyl polysiloxane may have only one silicon-bonded hydrogen atom. Alternatively still, the (B) organohydrogensiloxane may include both pendent and terminal silicon-bonded hydrogen atoms.

In certain embodiments, the (B) silicon hydride compound may have one of the following average formulas:

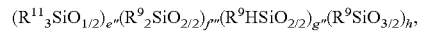

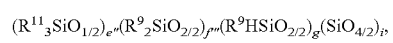

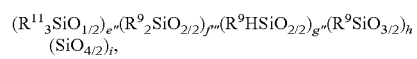

wherein each $R^{11}$ and $R^9$ is independently selected and defined above, e", f"', and g" are defined above, and h≥0, and i is ≥0. In each of the average formulas above, the sum of the subscripts is 1.

Some of the average formulas above for the (B) silicon hydride compound are resinous when the (B) silicon hydride compound includes T siloxy units (indicated by subscript h) and/or Q siloxy units (indicated by subscript i). When the (B) silicon hydride compound is resinous, the (B) silicon hydride compound is typically a copolymer including T siloxy units and/or Q siloxy units, in combination with M siloxy units and/or D siloxy units. For example, the organohydrogenpolysiloxane resin can be a DT resin, an MT resin, an MDT resin, a DTQ resin, an MTQ resin, an MDTQ resin, a DQ resin, an MQ resin, a DTQ resin, an MTQ resin, or an MDQ resin.

In various embodiments in which the (B) silicon hydride compound is resinous, or comprises an organopolysiloxane resin, the (B) silicon hydride compound typically has the formula:

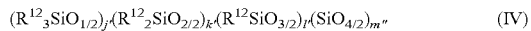

$(R^{12}{}_3SiO_{1/2})_{j'}(R^{12}{}_2SiO_{2/2})_{k'}(R^{12}SiO_{3/2})_{l'}(SiO_{4/2})_{m''}$ (IV)

wherein each $R^{12}$ independently is H or a substituted or unsubstituted hydrocarbyl group, with the proviso that in one molecule, at least one $R^{12}$ is H; and wherein $0 \leq j' \leq 1$; $0 \leq k' \leq 1$; $0 \leq l' \leq 1$; and $0 \leq m'' \leq 1$; with the proviso that $j'+k'+l'+m''=1$.

In certain embodiments, the (B) silicon hydride compound may comprise an alkylhydrogen cyclosiloxane or an alkylhydrogen dialkyl cyclosiloxane copolymer, represented in general by the formula $(R^{12}{}_2SiO)_{r'}(R^{12}HSiO)_{s'}$, where $R^{12}$ is independently selected and defined above, and where r' is an integer from 0-7 and s' is an integer from 3-10. Specific examples of suitable organohydrogensiloxanes of this type include $(OSiMeH)_4$, $(OSiMeH)_3(OSiMeC_6H_{13})$, $(OSiMeH)_2(OSiMeC_6H_{13})_2$, and $(OSiMeH)(OSiMeC_6H_{13})_3$, where Me represents methyl (—$CH_3$).

The (B) silicon hydride compound can be a single silicon hydride compound or a combination comprising two or more different silicon hydride compounds.

Finally, in a third embodiment, both proviso (1) and proviso (2) are true such that the (A) unsaturated compound also includes at least one silicon-bonded hydrogen atom per molecule, and the composition further comprises (B) a silicon hydride compound including at least one silicon-bonded hydrogen atom per molecule. Examples of suitable unsaturated compounds and silicon hydride compounds for this third embodiment are set forth above.

The (A) unsaturated compound, as well as the (B) silicon hydride compound, if present in the composition, may be disposed in a carrier vehicle. Examples of carrier vehicles are described.

The composition may comprise the (A) unsaturated compound and the (B) silicon hydride compound, when present, in varying amounts or ratios contingent on desired properties or end use application of the composition. In various embodiments when the composition comprises components (A) and (B), the composition comprises components (A) and (B) in an amount to provide a mole ratio of silicon-bonded hydrogen atoms to aliphatically unsaturated groups of from 0.3 to 5, alternatively from 0.6 to 3.

The composition further comprises (C) a catalyst. The catalyst is set forth above. Depending on a selection of the components of the composition, the catalyst may serve as a hydrosilylation-reaction catalyst and/or a dehydrogenative silylation-reaction catalyst, as described below.

A combination of different hydrosilylation-reaction catalysts may be utilized. For example, the composition may further comprise one or more supplemental catalysts in combination with the (C) catalyst.

If utilized, the supplemental catalyst typically comprises a Group 8 to Group 11 transition metal. Group 8 to Group 11 transition metals refer to the modern IUPAC nomenclature. Group 8 transition metals are iron (Fe), ruthenium (Ru), osmium (Os), and hassium (Hs); Group 9 transition metals are cobalt (Co), rhodium (Rh), and iridium (Ir); Group 10 transition metals are nickel (Ni), palladium (Pd), and platinum (Pt); and Group 11 transition metals are copper (Cu), silver (Ag), and gold (Au). Combinations thereof, complexes thereof (e.g. organometallic complexes), and other forms of such metals may be utilized as the supplemental catalyst.

Additional examples of catalysts suitable for the supplemental catalyst include rhenium (Re), molybdenum (Mo), Group 4 transition metals (i.e., titanium (Ti), zirconium (Zr), and/or hafnium (Hf)), lanthanides, actinides, and Group 1 and 2 metal complexes (e.g. those comprising calcium (Ca), potassium (K), strontium (Sr), etc.). Combinations thereof, complexes thereof (e.g. organometallic complexes), and other forms of such metals may be utilized as the supplemental catalyst.

The supplemental catalyst may be in any suitable form. For example, the supplemental catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

In specific embodiments, the supplemental catalyst comprises platinum. In these embodiments, the supplemental catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the supplemental catalyst include 1,3-diethenyl-1,1,3,3-tetramethyldisiloxane complexes with platinum. These complexes may be microencapsulated in a resin matrix. Alternatively, the supplemental catalyst may comprise 1,3-diethenyl-1,1,3,3-tetramethyldisiloxane complex with platinum. The supplemental catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole $(COD)PtCl_2$ with 0.045 mole COD and 0.0612 moles $HMeSiCl_2$.

The supplemental catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

Typically, however, the composition includes the (C) catalyst, but not the supplemental catalyst.

The (C) catalyst is present in the composition in a catalytic amount, i.e., an amount or quantity sufficient to promote a reaction or curing thereof at desired conditions. The catalytic amount of the (C) catalyst may be greater than 0.01 ppm, and may be greater than 1,000 ppm (e.g., up to 10,000 ppm or more). In certain embodiments, the typical catalytic amount of (C) catalyst is less than 5,000 ppm, alternatively less than 2,000 ppm, alternatively less than 1,000 ppm (but in any case greater than 0 ppm). In specific embodiments, the catalytic amount of the (C) catalyst may range from 0.01 to 1,000 ppm, alternatively 0.01 to 100 ppm, and alternatively 0.01 to 50 ppm of metal based on the weight of the composition. The ranges may relate solely to the metal content within the (C) catalyst or to the (C) catalyst altogether (including its ligands). In certain embodiments, these ranges relate solely to the metal content within the (C) catalyst.

The composition may further comprise one or more optional components, including adhesion promoters, carrier vehicles, dyes, pigments, anti-oxidants, heat stabilizers, flame retardants, flow control additives, biocides, fillers (including extending and reinforcing fillers), surfactants, thixotroping agents, water, carrier vehicles or solvents, pH buffers, etc. The composition may be in any form and may be incorporated into further compositions, e.g. as a component of a composition. For example, the composition may be in the form of, or incorporated into, an emulsion. The emulsion may be an oil-in-water emulsion, water-in-oil emulsion, silicone-in-oil emulsion, etc. The composition itself may be a continuous or discontinuous phase of such an emulsion.

Suitable carrier vehicles include silicones, both linear and cyclic, organic oils, organic solvents and mixtures of these. Specific examples of solvents may be found in U.S. Pat. No. 6,200,581, which is hereby incorporated by reference for this purpose. Examples of suitable organic carrier vehicles are set forth above with respect to the catalyst.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm²/sec, such as hexamethylcyclotrisiloxane, octamethylcyclotetrasiloxane, ecamethylcyclopentasiloxane, dodecamethylcyclohexasiloxane, octamethyltrisiloxane, decamethyltetrasiloxane, dodecamethylpentasiloxane, tetradecamethylhexasiloxane, exadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

The composition may be prepared by combining components (A)-(C), along with any optional components, in any order of addition, optionally with a master batch, and optionally under shear.

A method of preparing a hydrosilylation reaction product is also provided. The hydrosilylation reaction product is formed from the composition and may take a variety of forms depending on a section of the components in the composition.

The method comprises reacting an aliphatically unsaturated group and a silicon-bonded hydrogen atom in the presence of (C') a hydrosilylation catalyst to give the hydrosilylation reaction product. The (C') hydrosilylation catalyst is the (C) catalyst described above. The hydrosilylation reaction product is formed by an addition reaction between the silicon-bonded hydrogen atom and the aliphatically unsaturated group. As understood in the art, the hydrosilylation reaction can be generally represented, in the case of a double bond and in the presence of the (C') hydrosilylation catalyst, —Si—H+C═C—→—Si—CH$_2$—CH$_2$—. The (C') hydrosilylation catalyst and inventive method can be utilized in any hydrosilylation reaction, e.g. in lieu of or in addition to conventional hydrosilylation catalysts. The (C') hydrosilylation catalyst is generally less expensive than conventional hydrosilylation catalysts based on platinum, while still having excellent catalytic activity.

The aliphatically unsaturated group is present in the (A) unsaturated compound. At least one of the following two provisos applies: (1) the (A) unsaturated compound also includes at least one silicon-bonded hydrogen atom per molecule; and/or (2) the silicon-bonded hydrogen atom is present in the (B) silicon hydride compound separate from the (A) unsaturated compound. In a first embodiment, the proviso (1) is true such that the (A) unsaturated compound also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the (A) unsaturated compound also includes at least one silicon-bonded hydrogen atom per molecule, and that the composition further comprises the (B) silicon hydride compound including at least one silicon-bonded hydrogen atom per molecule. These embodiments are described in detail above with respect to the composition itself.

The aliphatically unsaturated group and the silicon-bonded hydrogen atom react in the presence of the (C') hydrosilylation reaction catalyst. The (A) unsaturated compound and/or the (B) silicon hydride compound, and/or a moiety thereof, may interact with the (C') hydrosilylation catalyst, and thus become X or L as defined above. Alternatively or in addition, the (A) unsaturated compound and/or the (B) silicon hydride compound may interact with the (C') hydrosilylation catalyst by displacing X or L, and thus become X or L as defined above via substitution.

The hydrosilylation-reaction product prepared via the method is not limited and is generally a function of the (A) unsaturated compound and, if utilized, the (B) silicon hydride compound. For example, the hydrosilylation-reaction product may be monomeric, oligomeric, polymeric, resinous, etc. The hydrosilylation-reaction product may comprise a fluid, an oil, a gel, an elastomer, a rubber, a resin, etc. The hydrosilylation-reaction product may take any form, as understood in the art, based on the selection of the (A) unsaturated compound and, if utilized, the (B) silicon hydride compound.

By way of example only, below are two reaction mechanisms that may be utilized via the inventive method. In these two reaction mechanisms, the method utilizes 1-octene as the (A) unsaturated compound and two different (B) silicon hydride compounds. The catalyst is the (C') hydrosilylation catalyst.

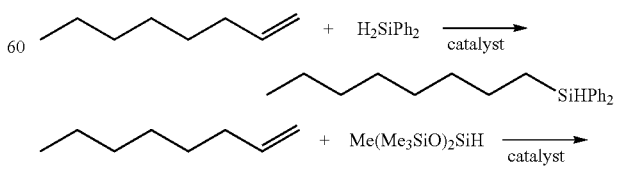

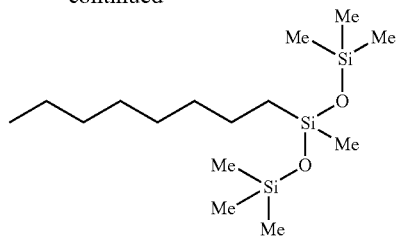

In the reaction mechanisms above, Ph is phenyl and Me is methyl. One of skill in the art understands how the (A) unsaturated compound and, if utilized, the (B) silicon hydride compound may be selected based on a desired target species of the hydrosilylation-reaction product.

The method may be utilized to prepare hydrosilylation-reaction products in the form of functionalized, e.g. olefin functionalization, silanes or siloxanes. Such functionalized silanes or siloxanes may be utilized in other end use applications, e.g. as a discrete component in another composition, including a curable composition, a personal care or cosmetic composition, etc.

The hydrosilylation-reaction product may also include various byproducts formed via the hydrosilylation reaction. For example, the hydrosilylation-reaction product typically includes a target species and various byproducts. The hydrosilylation-reaction product may also include other components, e.g. a carrier or solvent, if the method and reaction is carried out therein and/or if the composition includes such components. The method may further comprise isolating the target species, e.g. via any suitable purification method.

A method of preparing a dehydrogenative silylation reaction product is also provided. The dehydrogenative silylation reaction product is formed from the composition and may take a variety of forms depending on a section of the components in the composition.

The method comprises reacting an aliphatically unsaturated group and a silicon-bonded hydrogen atom in the presence of (C″) a silylation catalyst to give the dehydrogenative silylation reaction product. The (C″) silylation catalyst is the (C) catalyst described above. The dehydrogenative silylation reaction product is formed by a dehydrogenative silylation reaction between the silicon-bonded hydrogen atom and the aliphatically unsaturated group. As understood in the art, the dehydrogenative silylation reaction can be generally represented, in the case of a double bond and in the presence of the (C″) silylation catalyst, —Si—H+C═C—→—Si—C═C—+H$_2$. Hydrogen gas (H$_2$) is generally a byproduct of the dehydrogenative silylation reaction. The liberation of hydrogen gas (H$_2$) may result in a further side reaction between the hydrogen gas (H$_2$) and the aliphatically unsaturated group, which may hydrogenate the aliphatically unsaturated group in situ. Unlike in the addition reaction of hydrosilylation, dehydrogenative silylation does not involve saturation of the aliphatically unsaturated group. Thus, dehydrogenative silylation reactions are particularly desirable for functionalization of silanes or siloxanes, e.g. to impart ethylenic unsaturation.

The (C″) silylation catalyst and inventive method can be utilized in any dehydrogenative silylation reaction, e.g. in lieu of or in addition to conventional silylation catalysts. The (C″) silylation catalyst is generally less expensive than conventional silylation catalysts based on platinum, while still having excellent catalytic activity.

The aliphatically unsaturated group is present in the (A) unsaturated compound. At least one of the following two provisos applies: (1) the (A) unsaturated compound also includes at least one silicon-bonded hydrogen atom per molecule; and/or (2) the silicon-bonded hydrogen atom is present in the (B) silicon hydride compound separate from the (A) unsaturated compound. In a first embodiment, the proviso (1) is true such that the (A) unsaturated compound also includes at least one silicon-bonded hydrogen atom per molecule. In a second embodiment, the proviso (2) is true such that the composition further comprises (B) a silicon hydride compound including at least one silicon-bonded hydrogen atom per molecule. Finally, in a third embodiment, both proviso (1) and proviso (2) are true such that the (A) unsaturated compound also includes at least one silicon-bonded hydrogen atom per molecule, and that the composition further comprises the (B) silicon hydride compound including at least one silicon-bonded hydrogen atom per molecule. These embodiments are described in detail above with respect to the composition itself.

The dehydrogenative silylation reaction product prepared via the method is not limited and is generally a function of the (A) unsaturated compound and, if utilized, the (B) silicon hydride compound. For example, the dehydrogenative silylation reaction product may be monomeric (e.g. a silane), oligomeric, polymeric, resinous, etc. The dehydrogenative silylation reaction product may comprise a fluid, an oil, a gel, an elastomer, a rubber, a resin, etc. The hydrosilylation-reaction product may take any form, as understood in the art, based on the selection of the (A) unsaturated compound and, if utilized, the (B) silicon hydride compound. Generally, the dehydrogenative silylation reaction product includes at least one aliphatically unsaturated group per molecule, attributable to the (A) unsaturated compound.

By way of example only, when the (A) unsaturated compound comprises ethylene, and when the (B) silicon hydride compound is present and is Ph$_3$SiH, the dehydrogenative silylation reaction product is Ph$_3$SiCH═CH$_2$, where Ph is phenyl. Because ethylene is widely available and inexpensive, this inventive method allows for the preparation of vinyl-functional silanes, vinyl-functional siloxanes, vinyl-functional organopolysiloxanes, vinyl-functional organosilicon compounds, etc. at a reduced cost as compared to conventional techniques. One of skill in the art understands how the (A) unsaturated compound and, if utilized, the (B) silicon hydride compound may be selected based on a desired target species of the hydrosilylation-reaction product. For example, the (B) silicon hydride may be a polymer or resin such that the method may be utilized to impart ethylenic unsaturation to such polymer or resin. In certain embodiments, the dehydrogenative silylation reaction product comprises an alkenyl-functional compound. This is typically the case when the (B) silicon hydride compound is utilized separate from the (A) unsaturated compound. The alkenyl group of the alkenyl-functional compound is formed from the unsaturated compound, which bonds to silicon via dehydrogenative silylation in the dehydrogenative silylation reaction product.

Thus, the method may be utilized to prepare dehydrogenative silylation products in the form of functionalized, e.g. olefin functionalization, silanes or siloxanes. Such functionalized silanes or siloxanes may be utilized in other end use applications, e.g. as a discrete component in another composition, including a curable composition, a personal care or cosmetic composition, etc. Because the dehydrogenative silylation reaction product includes at least one aliphatically unsaturated group per molecule, the dehydrogenative silylation reaction product may be utilized in further reactions, e.g. in a hydrosilylation reaction. For example, the dehydrogenative silylation reaction product may be a component in a hydrosilylation-curable composition.

The dehydrogenative silylation reaction product may also include various byproducts formed via the dehydrogenative silylation reaction. For example, the dehydrogenative silylation reaction product typically includes a target species and various byproducts. The dehydrogenative silylation reaction product may also include other components, e.g. a carrier or solvent, if the method and reaction is carried out therein and/or if the composition includes such components. The method may further comprise isolating the target species, e.g. via any suitable purification method.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

Preparation Example 1: Ligand 1: $^{iPr}$PQpy

8-Bromo-2-(pyrid-2'-yl)quinoline (1.50 g, 5.26 mmol) is dissolved in THF (100 mL) to give a solution. The solution is cooled to −95° C. and a mixture of BuLi in hexane (1.6 M, 3.6 mL, 5.76 mmol) is added dropwise over a period of 15 min, resulting in a change to pale red in color, darkening upon completion of the addition of the mixture of BuLi in hexane. The flask is allowed to warm to −78° C. and stirred at −78° C. for 20 minutes. The contents of the flak are added via cannula over a period of 10 minutes to a solution of $^i$Pr$_2$PCl (806 mg, 5.28 mmol) in THF (100 mL) stirred at −95° C. Once addition is complete, the resulting solution is stirred at −95° C. for 20 minutes to give a dark green solution which is allowed to slowly warm to room temperature, resulting in a change to red in color. This solution is stirred for 48 hours at room temperature, before all volatiles are removed under reduced pressure to give a dark red residue. The residue is dissolved in toluene (100 mL), which is filtered through a plug of basic alumina to give a yellow solution. Removal of volatiles under reduced pressure gave the Ligand 1 as a thick orange oil which solidified on standing. Ligand 1 has the following structure:

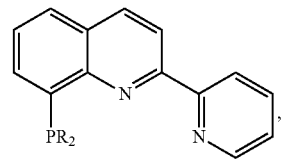

where each R is an isopropyl group.

Preparation Example 2: Ligand 2: $^{ArF}$PQpy

8-Bromo-2-(pyrid-2'-yl)quinoline (500 mg, 1.75 mmol) is dissolved in THF (10 mL) to give a solution. The solution is frozen in a glovebox cold well before a mixture of BuLi in hexane (1.6 M, 1.15 mL, 1.84 mmol) is added dropwise over a period of 5 min to as the solution is thawing to give a mixture, resulting in a colour change to red. The mixture is stirred for 3 minutes and refrozen in the glovebox cold well. The solution is removed from the glovebox cold well and as it thaws, is added dropwise over a period of 5 minutes to a stirred solution of bis(pentafluorophenylphosphine)bromide (783 mg, 1.76 mmol) in thawing THF (10 mL) which is also frozen in the glovebox cold well. Upon completion of the dropwise addition, the resulting solution is stirred while slowly warming to room temperature. This solution is stirred for 16 hours at room temperature, before all volatiles were removed under reduced pressure to give a pale residue. The pale residue is extracted with CH$_2$Cl$_2$ (2×30 mL), the fractions of which are combined and all volatiles removed to give a pale yellow residue which is washed with cold pentane (2×10 mL) and collected to give the Ligand 2 as an off white solid (890 mg, MW 570.32, 1.56 mmol, 89% yield). Ligand 2 has the following structure:

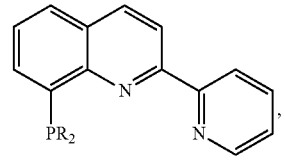

where each R is a tetrafluorophenyl group.

Preparation Example 1: Complex 1: FeBr$_2$ ($^{iPr}$PQpy)

Anhydrous FeBr$_2$ (0.216 g, 1 mmol) in THF is added to a solution of the Ligand 1 (0.322 g, 1 mmol) in 20 mL THF and stirred for 1 hour at room temperature to give a reaction mixture. The reaction mixture is diluted with pentane to cause precipitation of a green complex as a solid as the Complex 1. X-ray quality crystals of the Complex 1 are obtained from vapour diffusion of pentane. The Complex 1 has the following structure:

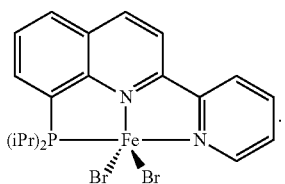

Preparation Example 2: Complex 2: FeBr$_2$ ($^{ArF}$PQpy)

Anhydrous FeBr$_2$ (0.216 g, 1 mmol) in THF is added to a solution of the Ligand 2 (0.322 g, 1 mmol) in 20 mL THF and stirred for 1 hour at room temperature to give a reaction mixture. The reaction mixture is diluted with pentane to cause precipitation of a ref complex as a solid as the Complex 2. X-ray quality crystals of the Complex 2 are obtained from vapour diffusion of pentane. The Complex 2 has the following structure:

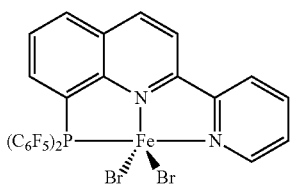

Preparation Example 3: Complex 3: CoCl$_2$ ($^{iPr}$PQpy)

Anhydrous CoCl$_2$ (0.130 g, 1 mmol) in THF is added to a solution of the Ligand 1 (0.322 g, 1 mmol) in 20 mL THF and stirred for 1 hour at room temperature to give a reaction mixture. The reaction mixture is diluted with pentane to cause precipitation of a grey-green complex as a solid as the Complex 3. X-ray quality crystals of the Complex 3 are obtained from vapour diffusion of pentane. The Complex 3 has the following structure:

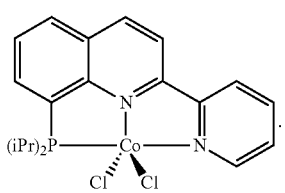

Preparation Example 4: Complex 4: CoBr$_2$ ($^{iPr}$PQpy)

Anhydrous CoBr$_2$ (0.219 g, 1 mmol) in THF is added to a solution of the Ligand 1 (0.322 g, 1 mmol) in 20 mL THF and stirred for 1 hour at room temperature to give a reaction mixture. The reaction mixture is diluted with pentane to cause precipitation of a blue-green complex as a solid as the Complex 4. X-ray quality crystals of the Complex 4 are obtained from vapour diffusion of pentane. The Complex 4 has the following structure:

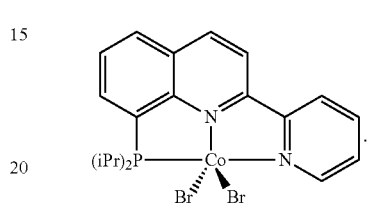

Preparation Example 5: Complex 5: CoCl$_2$ ($^{ArF}$PQpy)

Anhydrous CoCl$_2$ (0.130 g, 1 mmol) in THF is added to a solution of the Ligand 2 (0.570 g, 1 mmol) in 20 mL THF and stirred for 1 hour at room temperature to give a reaction mixture. The reaction mixture is diluted with pentane to cause precipitation of a green complex as a solid as the Complex 5. X-ray quality crystals of the Complex 5 are obtained from vapour diffusion of pentane. The Complex 5 has the following structure:

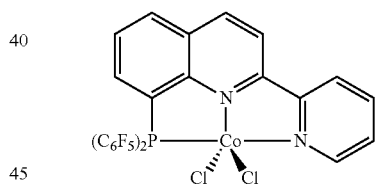

Examples 1-7

In Examples 1-7, an (A) unsaturated compound is reacted with a (B) silicon hydride compound in the presence of a (C") silylation catalyst to give a dehydrogenative silylation reaction product. The (C") silylation catalyst corresponds to certain complexes made in Preparation Examples 1-5 relating to Complexes 1-5, but in their activated form from being reacted in situ with an activating agent. In each of these Examples 1-7, the (A) unsaturated compound comprises ethylene. Table 1 below sets forth the particular (B) silicon hydride and (C") silylation catalyst utilized in each of Examples 1-7. Table 1 also includes the overall conversion, including, with respect to that overall conversion, the relative amount of the dehydrogenative silylation reaction product which underwent dehydrogenative silylation (—CH=CH$_2$) or hydrosilylation (—CH$_2$—CH$_3$).

TABLE 1

| Example | Silicon Hydride Compound | (C″) Silylation Catalyst | Conversion | —CH=CH$_2$ | —CH$_2$—CH$_3$ |
|---|---|---|---|---|---|
| 1 | 1 | Activated Complex 1 | 95 | 25 | 75 |
| 2 | 2 | Activated Complex 1 | 55 | 10 | 90 |
| 3 | 3 | Activated Complex 1 | 85 | 5 | 95 |
| 4 | 1 | Activated Complex 5 | 95 | 5 | 95 |
| 5 | 1 | Activated Complex 3 | 95 | 85 | 15 |
| 6 | 2 | Activated Complex 3 | 60 | 60 | 40 |
| 7 | 3 | Activated Complex 3 | 85 | 86 | 14 |

Silicon hydride compound 1 is triphenylsilane.
Silicon hydride compound 2 is triethoxysilane.
Silicon hydride compound 3 is heptamethyltrisiloxane.

Activated complex 1 is Complex 1 as prepared above reacted in situ with 2.2 equivalents of NaBEt$_3$H as an activating agent.

Activated complex 5 is Complex 5 as prepared above reacted in situ with 2.2 equivalents of NaBEt$_3$H as an activating agent.

Activated complex 3 is Complex 3 as prepared above reacted in situ with 2.2 equivalents of NaBEt$_3$H as an activating agent.

In Examples 1-7, each (C″) silylation catalyst is utilized in an amount of 2 mol % (based on the overall (C″ silylation catalyst, and not just the metal therein). Each (B) silicon hydride compound is utilized in an amount of 0.5 mmol. Each reaction is carried out in a 85 mL Fischer-Porter reactor saturated with 2 atm ethylene and in 2 mL toluene as a vehicle. More specifically, after loading the reactor with the (B) silicon hydride compound, toluene, and (C″) silylation catalyst, the contents of the reactor are frozen and the headspace is evacuated. The headspace of the reactor is then filled with 2 atm of ethylene, and the reactor is heated at 70° C. at constant pressure of ethylene. After 2 hours, the contents of the reactor are exposed to air to quench the reaction, filtered through a plug of silica gel, and purified by removing volatiles under vacuum.

As illustrated in Table 1 above, the (C″) silylation catalyst based on Co had a higher affinity for dehydrogenative sillyation (achieving greater (—CH=CH$_2$) production) than did the (C″) silylation catalyst based on Fe.

Examples 8-12

In Examples 8-12, an (A) unsaturated compound is reacted with a (B) silicon hydride compound in the presence of a (C) catalyst to give a reaction product. The catalyst may be considered a (C′) hydrosilylation catalyst and/or a (C″) silylation catalyst based on the reaction product form. The (C) catalyst corresponds to certain complexes made in Preparation Examples 1-5 relating to Complexes 1-5. Table 2 below sets forth the particular (A) unsaturated compound, (B) silicon hydride and (C) catalyst utilized in each of Examples 8-12. Table 1 also includes the overall conversion, including, with respect to that overall conversion, the relative amount of the dehydrogenative silylation reaction product which underwent hydrosilylation (—CH$_2$CH$_2$—), dehydrogenative silylation (—CH=CH—) or merely hydrogenation (—CH$_2$—CH$_3$).

In each of Examples 8-12, the (A) unsaturated compound has the following structure:

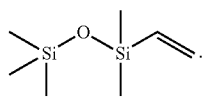

In each of Examples 8-12, the (B) silicon hydride compound has the following structure:

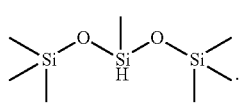

TABLE 2

| Example | Catalyst | Conversion | —CH$_2$CH$_2$— | —CH=CH— | —CH$_2$—CH$_3$ |
|---|---|---|---|---|---|
| 8 | Activated Complex 1 | 95 | 42 | 34 | 24 |
| 9 | Activated Complex 1 | >99 | 21 | 39 | 39 |
| 10 | Activated Complex 1 | 39 | 65 | 17 | 17 |
| 11 | Activated Complex 5 | 99 | 0 | 43 | 57 |
| 12 | Activated Complex 3 | 99 | 0 | 46 | 54 |

As illustrated in Table 2 above, the (C) catalyst based on Co had a higher affinity for dehydrogenative sillyation (achieving greater (—CH═CH—) production) than did the (C) catalyst based on Fe. The distinctions between Examples utilizing the same (C) catalyst are typically due to differences in parameters during the reaction. For example, Example 8 is carried out at 25° C.; Example 9 is carried out at 65° C.; Example 10 is carried out from −30 to 25° C.; Example 11 is carried out at 65° C.; and Example 12 is carried out at 65° C.

In Examples 8-9, each (C) catalyst is utilized in an amount of 1 mol % (based on the overall (C″ silylation catalyst, and not just the metal therein). In Examples 10-12, each (C) catalyst is utilized in an amount of 0.5 mol %

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A catalyst having the following structure:

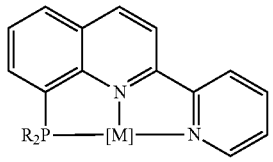

wherein each R is an independently selected substituted or unsubstituted hydrocarbyl group; [M] has formula M'X$_n$L$_m$, where M' is a metal selected from Fe, Co, and Ni; each X is independently a halogen atom, an alkoxy group, an amide group, an alkyl group, a silyl group, or H; each L is independently an olefin, an agostic C-H, an agostic Si-H, an ether, a nitrile, or N$_2$; n is 0, 1, or 2, and m is 0, 1, or 2.

2. The catalyst of claim 1, wherein: (i) each R is independently an isopropyl group or a C$_6$F$_5$ group; (ii) M' is Fe or Co; (iii) n is 1; (iv) m is 1; (v) each X is independently Cl or Br; or (vi) any combination of (i) to (v).

3. A catalyst mixture comprising the catalyst of claim 1 and an activating compound, wherein the activating compound is selected from the group consisting of: (i) a borohydride compound; (ii) an aluminum hydride compound; (iii) an organolithium compound;

(iv) an organomagnesium compound; (v) an alkalimetal amalgam; (vi) hydrogen; (vii) a metal hydride; (viii) a silyl hydride; or (ix) any combination of (i) to (viii).

4. A method of preparing a catalytic reaction product, said method comprising reductively activating the catalyst of claim 1 with an activating compound to prepare the catalytic reaction product, wherein the activating compound is selected from the group consisting of: (i) a borohydride compound; (ii) an aluminum hydride compound; (iii) an organolithium compound; (iv) an organomagnesium compound; (v) an alkalimetal amalgam; (vi) hydrogen; (vii) a metal hydride; (viii) a silyl hydride; or (ix) any combination of (i) to (viii).

5. The method of claim 4 wherein the activating compound is i) a borohydride compound; (ii) an aluminum hydride compound; (iii) an organolithium compound; (iv) an organomagnesium compound; or (v) any combination of (i) to (iv).

6. A method of preparing the catalyst of claim 1, said method comprising:
complexing a metal compound with a ligand to give the catalyst;
wherein the metal compound has the formula M'X$_2$, wherein M' is a metal selected from Fe, Co, and Ni and each X is independently a halogen atom; and
wherein the ligand has the following structure:

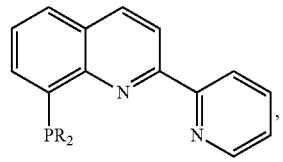

wherein each R is an independently selected substituted or unsubstituted hydrocarbyl group.

7. A composition, comprising:
(A) an unsaturated compound including at least one aliphatically unsaturated group per molecule, subject to at least one of the following two provisos:
(1) the (A) unsaturated compound also includes at least one silicon-bonded hydrogen atom per molecule; and/or
(2) the composition further comprises (B) a silicon hydride compound including at least one silicon-bonded hydrogen atom per molecule; and
(C) the catalyst of claim 1.

8. The composition of claim 7 wherein proviso (2) is true such that composition further comprises (B) the silicon hydride compound including at least one silicon-bonded hydrogen atom per molecule.

9. The composition of claim 8, wherein: (i) the (A) unsaturated compound includes at least two unsaturated groups per molecule; (ii) the (B) silicon hydride compound includes at least two silicon-bonded hydrogen atoms per molecule; or (iii) both (i) and (ii).

10. A method of preparing a hydrosilylation reaction product, said method comprising:
reacting an aliphatically unsaturated group and a silicon-bonded hydrogen atom in the presence of (C') a hydrosilylation catalyst to give the hydrosilylation reaction product;
wherein the aliphatically unsaturated group is present in (A) an unsaturated compound;
wherein at least one of the following two provisos applies:
(1) the (A) unsaturated compound also includes at least one silicon-bonded hydrogen atom per molecule; and/or
(2) the silicon-bonded hydrogen atom is present in (B) a silicon hydride compound separate from the (A) unsaturated compound; and
wherein the (C') hydrosilylation catalyst comprises the catalyst of claim 1.

11. A method of preparing a dehydrogenative silylation reaction product, said method comprising:
reacting an aliphatically unsaturated group and a silicon-bonded hydrogen atom in the presence of (C″) a silylation catalyst to prepare the dehydrogenative silylation reaction product;

wherein the aliphatically unsaturated group is present in (A) an unsaturated compound;

wherein at least one of the following two provisos applies:
  (1) the (A) unsaturated compound also includes at least one silicon-bonded hydrogen atom per molecule; and/or
  (2) the silicon-bonded hydrogen atom is present in (B) a silicon hydride compound separate from the (A) unsaturated compound; and wherein the (C") silylation catalyst comprises the catalyst of claim 1.

12. The method of claim 11 wherein proviso (2) is true such that composition further comprises (B) the silicon hydride compound including at least one silicon-bonded hydrogen atom per molecule and wherein the dehydrogenative silylation reaction product comprises an alkenyl-functional compound.

13. The method of claim 12 wherein the (A) unsaturated compound comprises ethylene.

\* \* \* \* \*